(12) United States Patent
Ueyoko (10) Patent No.: US 6,508,285 B2
(45) Date of Patent: Jan. 21, 2003

(54) PNEUMATIC TIRE (75) Inventor: Kiyoshi Ueyoko, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 1 day.

(21) Appl. No.: 09/739,031

(22) Filed: Dec. 14, 2000

(65) Prior Publication Data
US 2001/0032693 A1 Oct. 25, 2001

(30) Foreign Application Priority Data
Dec. 15, 1999 (JP) .............................. 11-356472

(51) Int. Cl.[7] .............................. B60C 15/00; B60C 3/04
(52) U.S. Cl. ........................ 152/539; 152/454; 152/552
(58) Field of Search ................................. 152/454, 539, 152/540, 541, 542, 543, 544, 552, 554, 523

(56) References Cited

U.S. PATENT DOCUMENTS 5,427,166 A * 6/1995 Willard, Jr. .................. 152/454
6,269,856 B1 8/2001 Ueyoko

FOREIGN PATENT DOCUMENTS

JP 10193924 7/1998

* cited by examiner

Primary Examiner—Jeff H. Aftergut
Assistant Examiner—Justin Fischer
(74) Attorney, Agent, or Firm—Birch, Stewart, Kolasch & Birch, LLP (57) ABSTRACT In a standard state of a tire, a contour of the tire side surface has a triangular portion projecting outside from a norm arc, which is a arc passing through a maximum width point P1 of a tire and tangentially contacting with the flange, and a portion recessing from the norm arc. The height (h1) of a maximum projecting point of the triangular projecting portion from a bead base line is 0.85~1.15 times of the height (h0) of the end of a carcass folded portion. The height (h2) of a maximum recessing point of the recessing portion is smaller than the height (h1), and is 0.30~0.90 times of the height (h0). A maximum boss distance (q1) from the norm arc and the maximum recess distance (q2) from the norm arc are respectively 0.001~0.040 times of the tire cross section width (W).

16 Claims, 5 Drawing Sheets

PNEUMATIC TIRE

BACKGROUND OF THE INVENTION

1. Field of the Invention

The present invention relates to a pneumatic tire, improved in the durability and the lightening of weight.

2. Description of the Prior Art

Figure 5:
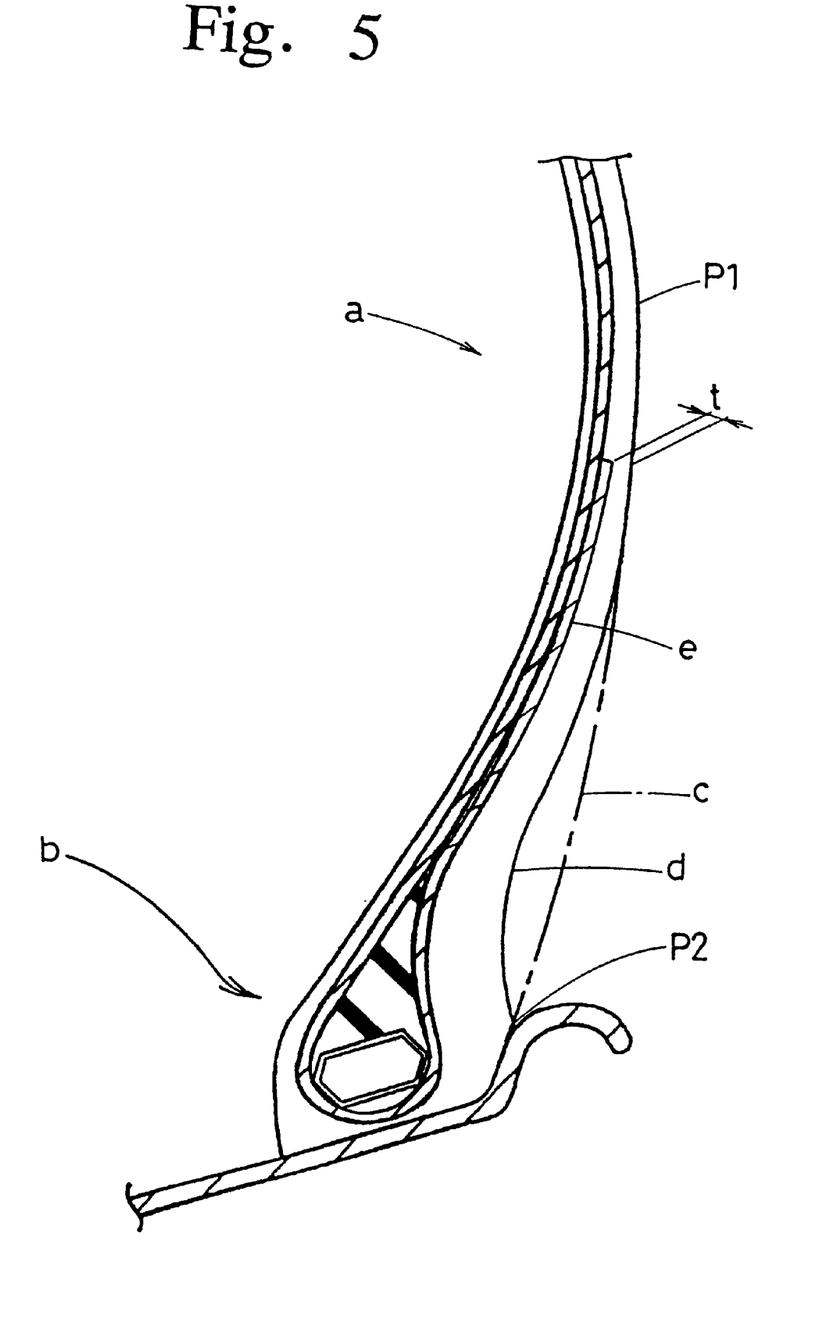
FIG. 5 is a diagram showing the contour of the bead portion of the prior art tire.

The applicant of this invention has proposed a tire improved in the bead durability and in lightening of weight in Japanese Patent Application Laid open No.10-193924 (U.S. Pat. No. 2,837,840). FIG. 5 is a schematic cross sectional view of a tire for heavy load in the prior art, showing the outer contour from a side wall portion (a) to a bead portion (b). The contour of the conventional tire in this region had been formed as an arc (c), connecting a tire cross section maximum width point p1 and a flange leaving point p2, as shown by a dotted line in the figure. On the other hand, the tire proposed in the Japanese Patent Application comprises a recessing portion (d) recessing inward than the norm arc (c) with respect to the tire axis direction, the recessing portion is disposed adjacent to the flange leaving point p2.

In the tire proposed by us, the volume of the gum is reduced by making a recessing portion (d) so that the deformation can take place in a large volume of the tire. Thus, the shear strain can be dispersed in a large volume of the tire, and the heat generation due to the deformation is made small. As a synergy of these effects, the bead durability is remarkably improved.

The tires proposed by us as well as a conventional tire have a contour of an arc (c) at the outer end of the carcass folded portion (e). As a result, there can be a case that the thickness (t) of the gum is too thin, because of the uncontrollable change of the side wall gum thickness due to the tolerance in the fabrication process or the tolerance of the height of the carcass folded portion (e). When the gum thickness (t) is too thin, a so-called gum destruction can occur due to the shear stress at the outer end of the carcass folded portion (e), which will be caused by the deformation of the side wall (a) due to the repeated inflation and the rolling of tire under a load, namely, such a structure of tire can lead to a serious tire damage, which could not be mended.

Therefore, a minimum necessary thickness (t) of the gum must be secured to avoid such a tire destruction. And it was forced to use a side wall gum material, which is thick as a whole. However, when such a thick gum material is used in a tire proposed by us in the former Japanese Patent application, the aforementioned advantages of such tire, i.e., the lightening of the bead portion and the improvement of the durability, can not be attained.

By the way, when the thickness (t) of the gum material is thickened locally, the carcass body will be pressed inwardly by the gum and extend along a path deviated inwardly from the optimum path line of the carcass. In such a case, the bead durability will be remarkably deteriorated, contrary to the intention.

SUMMARY OF THE INVENTION

An object of the present invention is to propose a pneumatic tire, the minimum necessary thickness (t) of the gum of which can be secured, restricting the increase of the gum volume to be small, so that the advantages of the lightening of weight and the improving of durability can be more effectively attained.

According to one aspect of the present invention, a pneumatic tire comprises a carcass having a carcass body portion extending from a tread portion to a bead core through a side wall portion, and a folded portion folded at the bead core, which is continuously formed with the carcass body portion, wherein:

in a standard state that the tire is installed on a normal rim and the inner pressure of the tire is the normal, the contour of the tire outer surface in the meridian cross section between a tire cross section maximum width point P1, which is the most outer point of the tire surface in the tire axis direction, and a flange separating point P3 to leave from a flange of the rim, is defined as follows:

the contour includes a substantially triangular formed projecting portion projecting outside in the direction of the tire axis direction with respect to a norm arc, which is an arc having its center on a line passing the tire cross section width maximum point P1, the norm arc passes through the point P1 and tangentially contacts with the flange, and a recessing portion recessing in the tire axis direction toward inside with respect to the norm arc, the recessing portion extends toward the inner side in the radial direction continuously with the projecting portion;

the height (h1) of a maximum projecting point with respect to a bead base line is 0.85~1.15 times of the height (h0) of the outer end of the folded portion, where the maximum projecting point is a point on the projecting portion and is separating at most from the norm arc in the tire axis direction,;

the height (h2) of the maximum recessing point with respect to a bead base line is smaller than the height (h1), and is 0.30~0.90 times of the height (h0), where the maximum recessing point is a point on the recessing portion and is separating at most from the norm arc in the tire direction; and the maximum boss distance (q1) from the norm arc to the maximum projecting point and the maximum recess distance (q2) from the norm arc to the maximum recessing point are respectively 0.001~0.040 times of the tire cross section width (W).

Wherein, said normal rim is the "standard rim" specified in JATMA, the "Measuring Rim" in ETRTO, the "Design Rim" in T&RA or the like., and said normal inner pressure is the "maximum air pressure" in JATMA, the "Inflation Pressure" in ETRTO, the maximum pressure given in the "Tire Load Limits at Various Cold Inflation Pressures" table in T&RA or the like.

DETAILED DESCRIPTION OF THE INVENTION

An embodiment of the present invention is explained below, referring to FIGS. 1 to 5.

Figure 1:
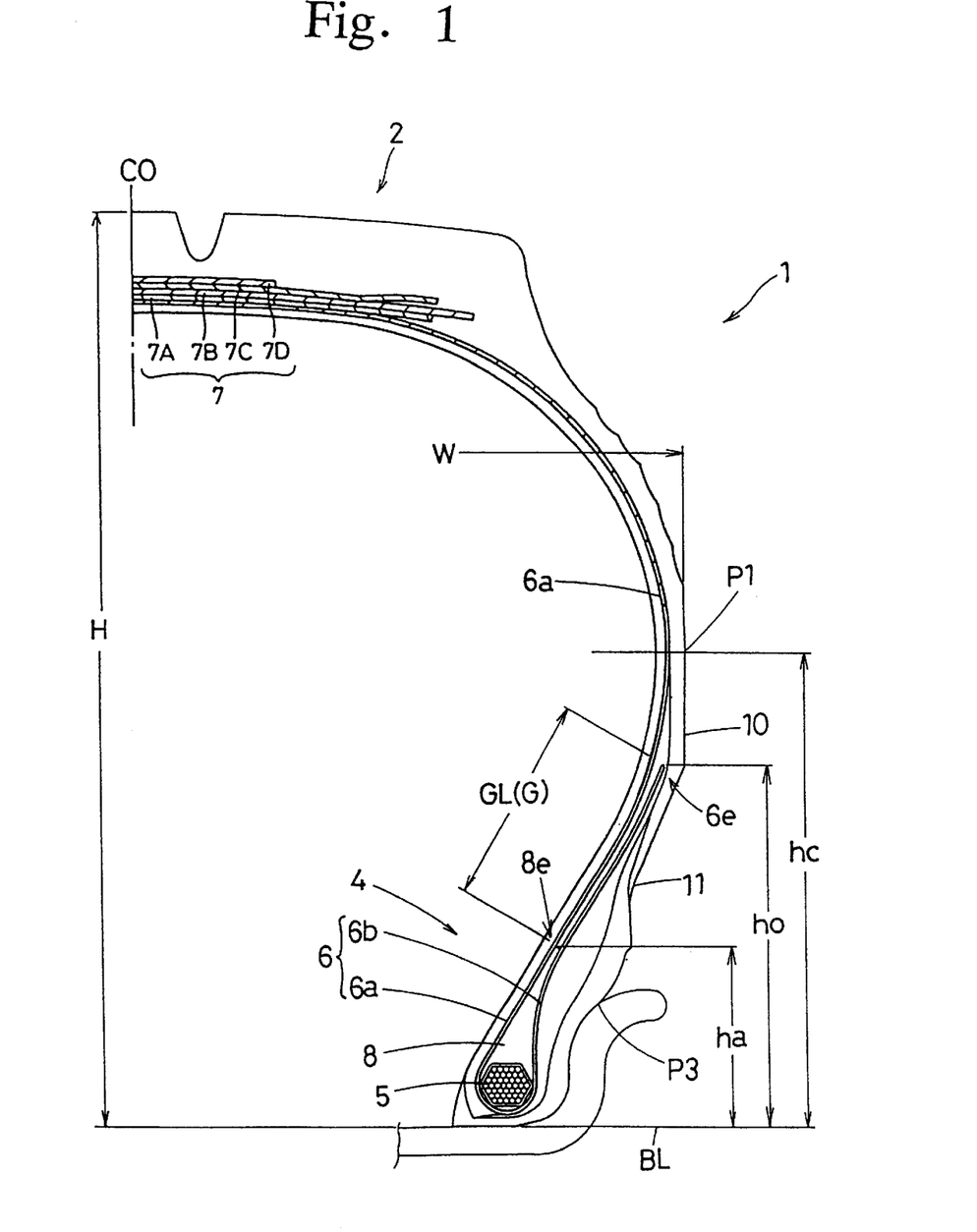
FIG. 1 is a cross sectional view of a tire according to an embodiment of the present invention.

FIG. 1 shows a meridian cross sectional view of a pneumatic tire 1 according to the present invention, (hereinafter referred to as a tire 1), which is formed as a heavy duty tire for use of a truck or bus, and is installed in a regular rim and is at the standard state with the regular inner pressure.

Referring to the figure, the tire 1 comprises a tread portion 2, a pair of side wall portions 3 starting from the both sides of the tread portion 2 and extending inward in the tire radial direction, and bead portions 4 located at the inner end of each of the side walls 3. The bead portions 4, 4 are bridged by a carcass 6.

The carcass 6 is comprised of one or more than one carcass ply(s) 6A formed of carcass codes which are organic fiber codes, such as, nylon, rayon, polyester, aromatic polyamide or steel codes, and are arranged in a configuration skewed 70~90° with respect to the tire equator CO. This example shows a case that the carcass is made of a sheet of carcass ply whose steel code is aligned at a 90° angle against the tire equator CO.

The carcass 6 comprises a carcass body 6a which extends from the tread portion 2 to the bead core 5 in the bead portion via the side wall portion 3, and a folded portion 6b which is a portion folded around the bead core 5 from the inner side to the outer side. The carcass body 6a and the folded portion 6b are fabricated as a one body. Belt layers 7 are disposed in the region inside of the tread portion 2 at the outside of the carcass body 6a.

The belt layers 7 are comprised of two or more than two belt plies. In this example, the belt layers 7 are comprised of 4 layers, namely, the inner most belt ply 7A arranged in a configuration skewed, for example, 50±15° with respect to the tire equator and outer belt plies 7B, 7C, 7D arranged in a configuration skewed in a angle smaller than 30° with respect to the tire equator. The belt plies are configured one over another so that at least one crossing over point appears, where a belt cord in a ply crosses over a belt cord in another ply. The belt cord in this example is made of steel cord. However, organic fibers, such as, nylon, polyester, rayon, or aromatic polyamide can be used as a belt ply material, according to the necessity.

A bead apex gum 8 is disposed in the bead portion 4 between the carcass body 6a and the folded portion 6b. The bead apex gum 8 starts from the bead core 5 and extends outwardly in the tire radial direction, and is tapered to become thinner. The bead apex gum 8 is made from gum which has a durometer hardness of 60~99°. The bead apex gum is formed so that the inner contour is a substantially straight line parallel to the carcass body 6a, and the outer contour is a concave arc line.

The height (ha) of the outer end 8e of the bead apex gum 8 from the bead base line BL is 6~31% of the height (H) of the tire cross section (shown in FIG. 1), preferably 8~22%. Because the bead apex gum 8 is miniaturized in this way, the compressive distortion in the folded portion can be reduced. As a result, the durability of the folded portion can be improved and the generation of heat at the bead can be suppressed. By the way, the term "bead base line BL" is, as regulated in JATMA, TRA and ETRTO, a line parallel to the tire axis line and passing the rim radius.

The folded portion 6b of the carcass 6 extends in the radial direction further over the bead apex gum 8 to form an adjacent region G, where the folded portion is disposed adjacent to the carcass body 6a. The outer end 6e of the folded portion 6b terminates at a point inner in the radial direction compared to a tire cross section maximum width point P1 where the side wall 3 has the most outer position in the tire axis direction. Namely, the height (ho) of the outer end 6e from the bead base line BL is smaller than the height (hc) of the tire cross section maximum width point P1.

Figure 2:
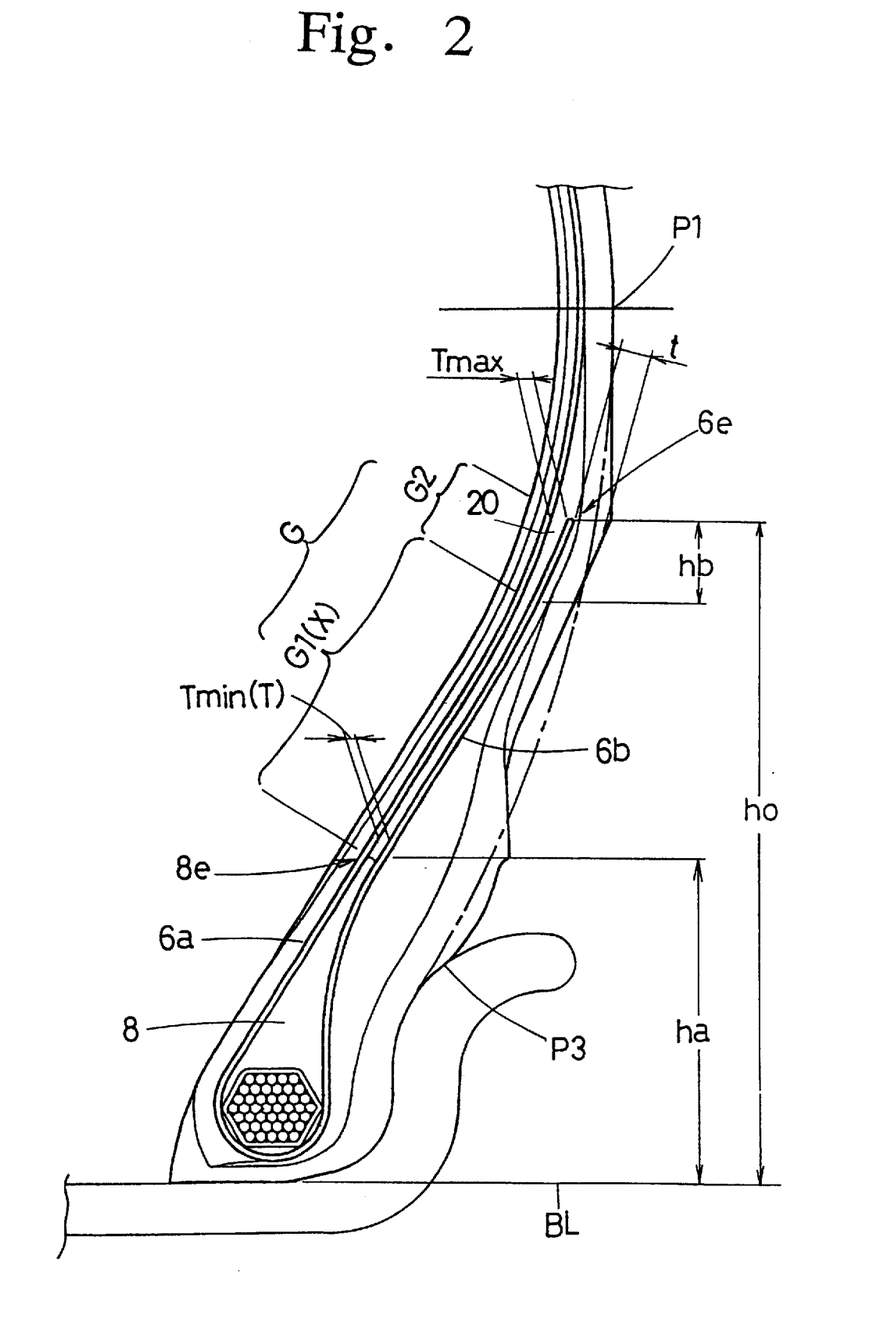
FIG. 2 is a detailed cross sectional view of the bead portion.

In the adjacent region G, as shown in FIG. 2, it is found a minimum adjacent portion X near to the outer end 8e of the bead apex gum 8, where the cord distance T between the folded portion 6b and the carcass body 6a has the minimum value Tmin. The minimum value Tmin can be 0.15~5.0 times of the diameter of the carcass cord. When the value is smaller than 0.15 times, the strength of the gum tends to be insufficient against the deformation in the region near to the outer end 8e. On the other hand, when the value is larger than 5.0 times, the heat generation is large, and a so-called tire separation phenomenon tends to take place starting from this outer end 8e. Thus, preferably, the minimum value Tmin shall be 0.5~3.5 times of the carcass cord, more preferably, be 0.8~2.5.

Although the minimum adjacent portion X can be a small local region, it is preferable that the minimum value Tmin of the carcass cord distance T is kept in a continuous region, so as to form a parallel region G1 where the carcass body 6a and the folded portion extend substantially in parallel to each other, as shown in this example. Such a parallel region G1 can effectively distribute the heat generation, which will be caused by the shear distortion applied to this region. As a result, it can be improved to suppress a gum splitting phenomenon, which may take place near to the outer end 8e of the bead apex gum 8. By the way, the folded portion 6b and the carcass body 6a, in this example, extend respectively in a straight line in this parallel region G1.

In this example, a distance gradually increasing zone G2 is found in the adjacent region G. The distance gradually increasing zone G2 is formed continuously with the parallel region G1 in this embodiment, and is disposed radially outer compared to the minimum adjacent portion X. In the distance gradually increasing zone G2, the carcass cords distance (T) defined hereinbefore gradually increases toward the outer end 6e of the folded portion 6b. Due to the distance gradually increasing zone G2, the thickness of the gum between the plies can be increased at the position of the outer end 6e of the folded portion 6b, correspondingly to the minimum adjacent portion X. Therefore, it is possible to suppress the gum splitting phenomenon in long time, which could occur at a region near to the outer end 6e. Namely, it is possible to suppress the gum splitting, which can induce a tire separation phenomenon, in the region near to the outer end 6e of the folded portion 6b as well as in the region near to the outer end 8e of the bead apex gum 8.

The radial length (hb) of the distance gradually increasing zone G2 in this example is preferably 0.1~0.9 times of the radial distance (h0-ha) between the outer ends 6e and 8e, and the figures shows the case of 0.2 times. The carcass cord distance Tmax at the outer end 6e is preferably 1.5~4.5 times of the minimum value Tmin.

In said increasing zone G2, it is desirable to provide a cushion rubber 20 of the low modulus further than the topping rubber of the carcass 6 between the carcass body 6a and the folded portion 6b, in order to ensure the carcass cords distance (T). The 100% modulus of this cushion rubber 20 is 5~30 $kgf/cm^2$, and the thickness of the cushion rubber 20 is greater than the thickness of the topping rubber of the carcass 6. Such the cushion rubber 20 absorb the strain between the carcass body 6a and the folded portion 6b. As the result, when the code loose arose at the outer end 6e of the folded portion 6b, it can be suppressed that the code loose progresses for the separation of rubber.

Figure 3:
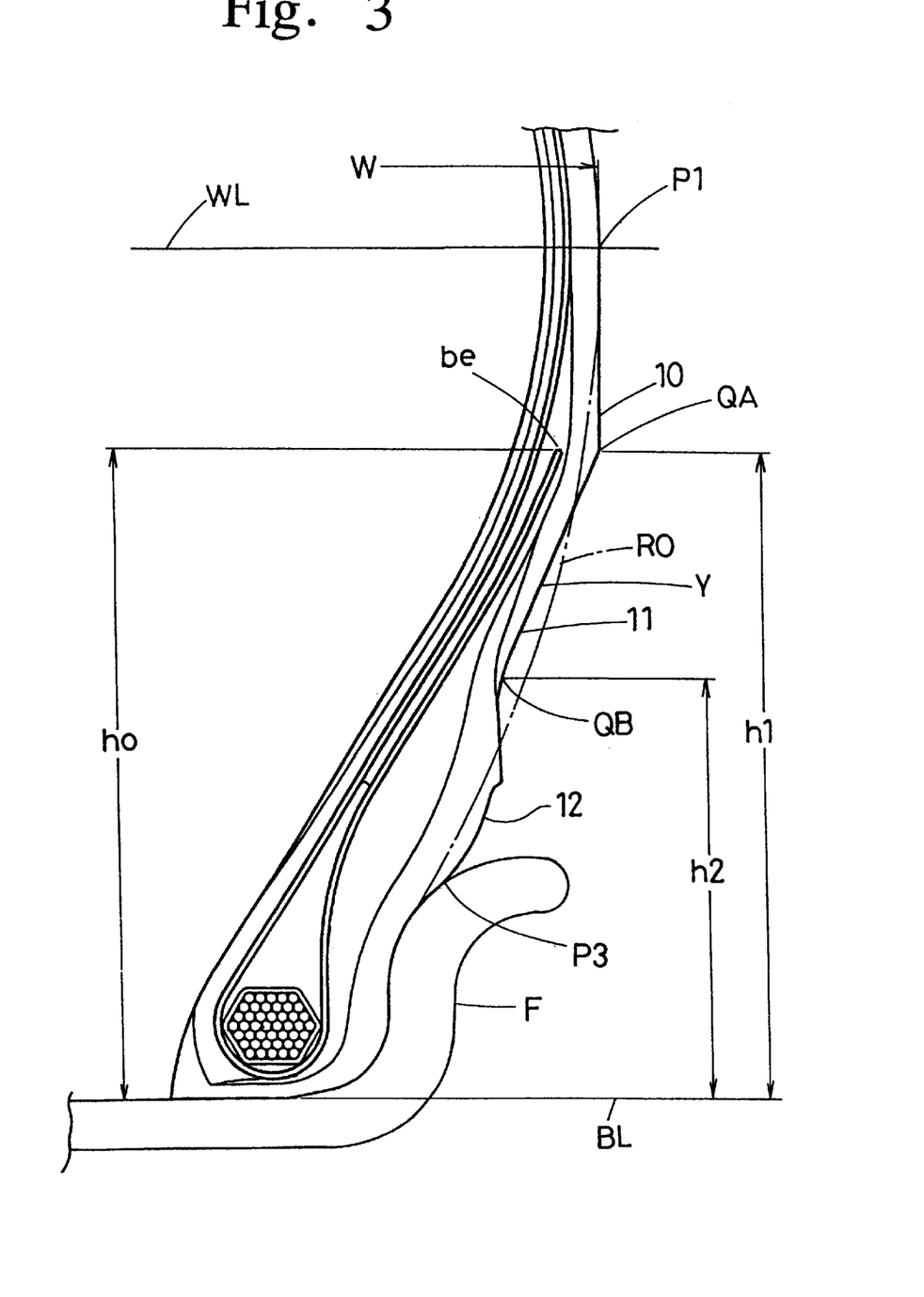
FIG. 3 is a diagram for explaining the contour of the tire.

The contour Y of the tire outer surface of the tire 1 in the region between the tire cross section width maximum point P1 (hereinafter referred to width maximum point P1) and the separating point P3 leaving from the flange F is formed so that a boss portion 10 projecting outwardly in the tire axis direction with respect to a norm arc RO and a recessing portion 11 are formed in the standard state of the tire. The recessing portion 11 is continuous with the boss portion 10 and extending in the radial direction so as to recess inwardly in the tire axis direction with respect to the norm arc RO The norm arc RO is an arc, which has a center on the line passing through the width maximum point P1 and being parallel to the tire axis direction line WL. The norm arc RO passes the width maximum point P1 and tangentially contacts with the inner side of the flange F.

Figure 4:
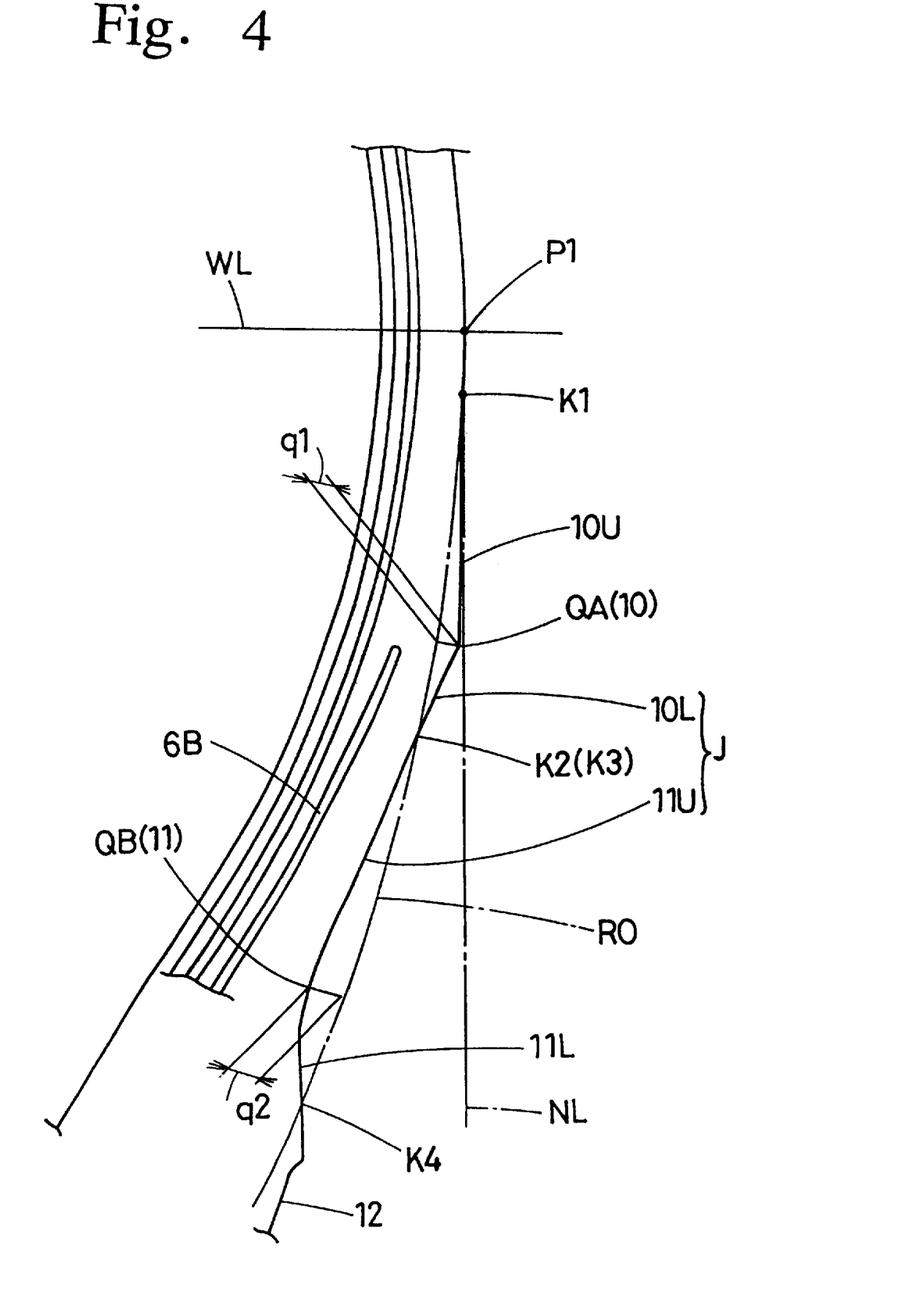
FIG. 4 is a diagram showing the detailed projecting portion and the recessing portion.

The boss portion 10 has, as shown in FIG. 4, an over radius starting point K1 and an under radius starting point K2 on the norm arc RO, and a maximum projecting point QA between the points K1 and K2. The maximum projecting point QA is disposed on a tire radius direction line NL passing through the width maximum point P1, or in a region radially inside in the tire axis direction compared to the tire radius direction line NL.

The contour of the tire is formed so that a straight boss upper side contour 10U is formed between the over radius starting point K1 and the maximum projecting point QA and a straight boss under side contour 10L is formed between the maximum projecting point QA and the under radius starting point K2, when the tire is installed in a standard rim and the inner pressure of the tire is 50 kPa (inner pressure 50 kPa). This example shows a preferable configuration that the boss upper side contour 10U is formed so as to be a tangential of the norm arc RO. The over radius starting point K1 is disposed on the width maximum point P1 or near to this point P1.

The recessing portion 11 has an over radius ending point K3 and an under radius ending point K4 on the norm arc RO, and a maximum recessing point QB between the points K3 and K4. The contour of the tire separates at most from the norm arc RO in the tire axis direction at the maximum recessing point QB in the recessing portion. When the over radius ending point K3 is same to the under radius starting point K2, a recess upper side contour 11U, which is a contour portion between the over radius ending point K3 and the maximum recessing point QB, is smoothly connected with the boss under side contour 10L. This example shows a preferable configuration that the recess upper side contour 11U and the boss under side contour 10L are formed so as to be a straight line J which is substantially parallel to the folded portion 6b.

When the inner pressure is 50 kPa, the form of a tire substantially corresponds to that in the vulcanization process in a mould, thus the inner strain is small and the deformation is the minimum. Therefore, the tire or the mould for fabricating the tire of this example is formed so that the boss upper side contour 10U and the boss under side contour 10L are a straight line respectively and the recess upper side contour 11U and the boss under side contour 10L form a common straight line J.

A recess under side contour 11L of the recessing portion 11 disposed between the maximum recessing point QB and the under radius ending point K4 is smoothly connected with a swelling portion 12. The swelling portion 12 extends in the shape of a convex arc from the ending point K4 on the norm arc RO to the separating point P3 on the norm arc RO while swelling axially outwardly from the norm arc RO.

Because a recessing portion 11 is formed at the side of the separating point P3 to leave from the flange F in this manner, the tire can deform in a large volume. Therefore, the shear deformation can be distributed in a large volume of the tire and the heat generation can be reduced. And the bead durability of the tire can be improved due to the synergy of these effects.

The cross section of the boss portion 10 is substantially a triangle, which has a maximum projecting point QA in the region, where the height is near to the height of the outer end 6e of the folded portion 6b. Therefore, it is possible to secure a minimum necessary thickness (t) of gum between the outer end 6e and the outer surface of the tire, and simultaneously to suppress the increase of the gum volume in the minimum level. Therefore, it is possible to suppress the crucial tire damage which may start from the outer end 6e. Simultaneously, it is possible to effectuate the lightening of the tire due to the formation of the recessing portion 11 and to improve the tire durability.

It is important to design the height (h1) of the maximum projecting point QA from the bead base line BL to be 0.85~1.15 times of the height (h0) of the folded portion 6e. When the height (h1) is out of the this range, the proper thickness (t) of the gum can not be secured, which will cause a crucial tire damage, for example, a ply loose due to a side wall destruction. Or an inequality pattern corresponding to the outer end 6e will appear on the outer surface of the tire, which will deteriorate the appearance of the tire.

When the recess upper side contour 11U and the boss under side contour 10L are formed as a common straight line J parallel to the folded portion 6b, as shown in this example, the gum thickness (t) does not change, even when the height of the folded portion 6b uncontrollably changes according to the allowance in the production process. Thus such a structure is preferable. When the cross section of the boss portion 10 forms a triangle, the distribution of the rigidity changes smoothly and the stress due to the repeating rolling under a load is distributed in a large volume. Therefore, it is possible to suppress not only the damage which may start from the outer end 6e, but also damages of tire destruction which may be newly caused by the forming of the boss portion 10 itself. Especially, when the boss upper side contour 10U is tangential to the norm arc RO, the rigidity changes more smoothly, thus it is preferable.

It is also important that the maximum boss distance (q1) from the norm arc RO to the maximum projecting point QA and the maximum recess distance (q2) from the norm arc RO to the maximum recessing point QB are respectively 0.001~0.040 times of the tire cross section width (W).

When the maximum boss distance (q1) is smaller than 0.001 times of the width (W), the thickness (t) of gum is insufficient, therefore, gum destruction due to the shear deformation at the outer end can take place, and a crucial tire damage, for example, ply loose due to the splitting of the side wall, can take place. Or an inequality pattern corresponding to the outer end 6e will appear on the outer surface of the tire, which will deteriorate the appearance of the tire. On the other hand, when the maximum boss distance (q1) excesses the 0.04 times of the width (W), an unnecessary increase of weight will be invited, but also the improvement of the durability according to the recessing portion will be hindered. Therefore, it is preferable that the maximum distance (q1) is 0.003~0.020 times of width (W).

And when the maximum recess distance (q2) is smaller than 0.001 times of the width (W), the improvement of the durability according to the lightening of the weight and the low heat generation can not be expected. On the other hand, when it excesses 0.04 times of width (W), the gum thickness from the carcass cord in the region of the folded portion 6b is too small. Therefore, gum destruction due to the stress deformation of the side wall gum by the repeated rolling under load can take place, and a crucial tire damage, for example, ply loose due to the splitting of the side wall, can take place. Or an inequality pattern corresponding to the carcass cord will appear on the outer surface of the tire, which will deteriorate the appearance of the tire. Therefore, it is preferable that the maximum recess distance (q2) is 0.003~0.020 times of width (W).

It is also important that the height (h2) of the maximum recessing point QB from the bead base line BL is smaller than the height (h1), and simultaneously it is 0.30~0.90 times of the height (h0). When the height is smaller than 0.3 times of height (h0), the tire can not be compressed sufficiently by the flange F, and the movement of the bead 4 during the running of the tire will be large, which will lead to raise the temperature of the bead 4, and as a result, the bead durability will be remarkably deteriorated. On the contrary, when the height excesses 0.90 times of height (h0), the outer end 6e becomes too near to the maximum recessing point QB, and the stress concentrates to this maximum recessing point QB, and gum destruction will take place. Therefore it is preferable that the height (h2) is 0.4~0.8 times of height (h0).

An especially preferable embodiment of the present invention is explained hereinbefore, however, persons skilled in this art will understand that the scope of the present invention is not limited by the disclosed and illustrated embodiment, but shall be understood according to the definition in the claims. And the present invention can be modified or changed in the scope of the invention. For example, the tire according to the present invention can be applied to tires in other categories, for example, tires for van truck or small truck. Further, the present invention can be applied not only to a tire with tube, but also to a tire without tube.

Experimental Data

Tires for heavy load having the structure shown in FIG. 1, the tire size of which are 10.00R20, are made for study, and are tested. Their specification data are listed in Tables 1 and 2. The result of the study with respect to the durability, the appearance note, rim chafing note of those tires are listed in those Tables. The specification data concerning to the carcass and the belt layer, etc, are identical and are listed in Table 3. The quantity GL in Tables 1 and 2 denotes the length of the adjacent region G, which is shown in FIG. 1.

(1) Durability:

Each of tires for study is rolled on a drum at a speed of 20 km, under a condition that the tire is installed on a rim of 7.00×20, the inner pressure is 800 kPa, load weight is 9000 kg, and is stopped when a visible damage appeared. The running distance until the stopping is compared by an index, which is the ratio of the running distance to that of the prior art tire. The index for the prior art tire is referred to be 100, and the higher index the tire has, the better the tested tire is.

(2) Appearance Note:

The appearance of tire was visually observed whether inequalities due to the outer end of carcass or due to the carcass cord appear on the outer surface of the tire, under the condition that the inner pressure of the tire is 800 kPa. The tire was estimated by an index, the index of the prior art tire is referred to be 100, and the higher the index value is, the better the appearance note of the tested tire is.

(3) Rim chafing Note:

The degree of rim chafing is visually observed, when the durability test is finished. The tire was estimated by an index, the index of the prior art tire is referred to be 100, and the higher the index value is, the better the rim chafing note is.

TABLE 1

|  | Comparison (#1) | Comparison (#2) | Comparison (#3) | Comparison (#4) | Comparison (#5) | Comparison (#6) | Comparison (#7) | Comparison (#8) |
|---|---|---|---|---|---|---|---|---|
| h0 | 82 | 113 | 94 | 94 | 94 | 94 | 94 | 94 |
| h1 | 95 | 95 | 95 | 95 | 95 | 95 | 95 | 95 |
| h1/h0 | 1.16 | 0.84 | 1.01 | 1.01 | 1.01 | 1.01 | 1.01 | 1.01 |
| q1 | 2.75 | 2.75 | 0.25 | 13.8 | 2.75 | 2.75 | 2.75 | 2.75 |
| q2 | 19.3 | 19.3 | 19.3 | 19.3 | 0.25 | 13.8 | 13.8 | 13.8 |
| W | 275 | 275 | 275 | 275 | 275 | 275 | 275 | 275 |
| q1/W | 0.01 | 0.01 | 0.0009 | 0.05 | 0.01 | 0.01 | 0.01 | 0.01 |
| q2/W | 0.007 | 0.007 | 0.007 | 0.007 | 0.0009 | 0.05 | 0.05 | 0.05 |
| h2/h0 | 0.7 | 0.7 | 0.7 | 0.7 | 0.7 | 0.7 | 0.2 | 1.0 |
| t | 3.0 | 2.0 | 4.0 | 9.0 | 7.0 | 7.0 | 7.0 | 7.0 |
| GL | 43 | 68 | 50 | 50 | 50 | 50 | 50 | 50 |
| Tire weight | 94 | 100 | 96 | 102 | 103 | 94 | 102 | 99 |
| Durability | 105 | 96 | 108 | 107 | 101 | 108 | 86 | 100 |
| Appearance Note | 95 | 85 | 90 | 100 | 100 | 85 | 100 | 100 |
| Rim Chafing Note | 100 | 100 | 100 | 100 | 100 | 100 | 80 | 100 |

TABLE 2

|  | Embodiment (#1) | Embodiment (#2) | Embodiment (#3) | Embodiment (#4) | Embodiment (#5) | Embodiment (#6) | Embodiment (#7) | Prior Art Tire |
|---|---|---|---|---|---|---|---|---|
| h0 | 94 | 94 | 94 | 94 | 94 | 94 | 94 | 94 |
| h1 | 95 | 95 | 95 | 95 | 95 | 95 | 95 | None |

TABLE 2-continued

|  | Embodiment (#1) | Embodiment (#2) | Embodiment (#3) | Embodiment (#4) | Embodiment (#5) | Embodiment (#6) | Embodiment (#7) | Prior Art Tire |
|---|---|---|---|---|---|---|---|---|
| h1/h0 | 1.01 | 1.01 | 1.01 | 1.01 | 1.01 | 1.01 | 1.01 | — |
| q1 | 2.75 | 0.83 | 8.25 | 8.25 | 8.25 | 8.25 | 8.25 | — |
| q2 | 2.2 | 2.2 | 2.2 | 0.83 | 8.3 | 8.3 | 8.3 | — |
| W | 0.01 | 0.01 | 0.01 | 0.01 | 0.01 | 0.01 | 0.01 | — |
| q1/W | 0.01 | 0.001 | 0.04 | 0.04 | 0.04 | 0.04 | 0.04 | — |
| q2/W | 0.008 | 0.008 | 0.008 | 0.001 | 0.04 | 0.04 | 0.04 | — |
| h2/h0 | 0.7 | 0.7 | 0.7 | 0.7 | 0.7 | 0.3 | 0.9 | 0 |
| t | 7.0 | 5.0 | 5.0 | 5.0 | 5.0 | 5.0 | 5.0 | 0 |
| GL | 50 | 50 | 50 | 50 | 50 | 50 | 50 | 0 |
| Tire weight | 95 | 94 | 97 | 98 | 99 | 94 | 97 | 100 |
| Durability | 120 | 120 | 120 | 120 | 120 | 120 | 120 | 100 |
| Appearance Note | 103 | 98 | 102 | 102 | 102 | 102 | 102 | 100 |
| Rim Chafing Note | 104 | 104 | 104 | 104 | 104 | 98 | 104 | 100 |

TABLE 3

| Carcass: | |
|---|---|
| Ply Number (sheet) | 1 |
| Cord Constitution | Steel Cord (3 × 0.2 + 7 × 0.23) |
| Cord Skew Angle (degree) | 90 |
| Cord Density | 38 cords/5 cm (measured at an under portion of the bead core) |
| Belt layer: | |
| Ply Number (sheet) | 4 |
| Cord Constitution | Steel Cord (3 × 0.2 + 6 × 0.35) (with respect to the inner ply) |
| Cord Skew Angle (degree) | +50/+18/−18/−18 |
| Cord Density | 26 cords/5 cm |

From Tables 1 and 2, it can be convinced that the durability of tire is remarkably improved, and the lightening of tire weight is attained in those tires according to embodiments of the present invention. Simultaneously, the rim chafing can be decreased and a high level tire appearance can be retained.

Because the tire according to the present invention is constituted as explained hereinbefore, it is possible to secure surely a necessary gum thickness at the carcass outer end, thus, it is possible to improve the durability and to lighten the tire weight.

What is claimed is:

1. A pneumatic tire comprising a carcass having a carcass body portion extending from a tread portion to a bead core through a side wall portion, and a folded portion folded at the bead core, which is continuously formed with the carcass body portion, wherein:

in a standard state that the tire is installed on a normal rim and the inner pressure of the tire is the normal, the contour of the tire outer surface in the meridian cross section between a tire cross section maximum width point P1, which is the most outer point of the tire surface in the tire axis direction, and a flange separating point P3 to leave from a flange of the rim, is defined as follows:

the contour includes a substantially triangular formed projecting portion projecting outside in the direction of the tire axis direction with respect to a norm arc, which is an arc having its center on a line passing the tire cross section maximum width point P1, the norm arc passes through the point P1 and tangentially contacts with the flange, and a recessing portion recessing in the tire axis direction toward inside with respect to the norm arc, the recessing portion extends toward the inner side in the radial direction continuously with the projecting portion;

the height (h1) of a maximum projecting point with respect to a bead base line is 0.85~1.15 times of the height (h0) of the outer end of the folded portion, where the maximum projecting point is a point on the projecting portion and is separating at most from the norm arc in the tire axis direction;

the height (h2) of the maximum recessing point with respect to a bead base line is smaller than the height (h1), and is 0.30~0.90 times of the height (h0), where the maximum recessing point is a point on the recessing portion and is separating at most from the norm arc in the tire direction; and the maximum boss distance (q1) from the norm arc to the maximum projecting point and the maximum recess distance (q2) from the norm arc to the maximum recessing point are respectively 0.001~0.040 times of the tire cross section width (W), wherein the tire is formed so that the outer contour between the maximum projecting point and the maximum recessing point is a straight line having an inclination parallel to that of the folded portion, in the state that the tire is installed on a normal rim and the inner pressure of the tire is 50 kPa.

2. The pneumatic tire according to claim 1, wherein the maximum boss distance (q1) and the maximum recess distance (q2) are respectively 0.003 to 0.020 times of the tire cross section width (W).

3. The pneumatic tire according to claim 1, wherein the height (h2) of the maximum recessing point is 0.4 to 0.8 times of the height (h0).

4. The pneumatic tire according to claim 1, wherein the tire is formed so that the outer contour between the tire cross section maximum width point and the maximum projecting point is a common straight line, in the state that the tire is installed on a normal rim and the inner pressure of the tire is 50 kPa.

5. The pneumatic tire according to claim 1, wherein the contour of the tire comprises an outer convex swelling portion, where the contour swells to the outside of the norm arc in the tire axis direction, the swelling portion is disposed at a region radially inner side of the recessing portion and is connected with the separating point to leave from the rim.

6. The pneumatic tire according to claim 2, wherein the height (h2) of the maximum recessing point is 0.4 to 0.8 times of the height (h0).

7. The pneumatic tire according to claim 2, wherein the tire is formed so that the outer contour between the tire cross section maximum width point and the maximum projecting point is a common straight line, in the state that the tire is installed on a normal rim and the inner pressure of the tire is 50 kPa.

8. The pneumatic tire according to claim 3, wherein the tire is formed so that the outer contour between the tire cross section maximum width point and the maximum projecting point is a common straight line, in the state that the tire is installed on a normal rim and the inner pressure of the tire is 50 kPa.

9. The pneumatic tire according to claim 2, wherein the tire is formed so that the outer contour between the maximum projecting point and the maximum recessing point is a straight line having an inclination parallel to that of the folded portion, in the state that the tire is installed on a normal rim and the inner pressure of the tire is 50 kPa.

10. The pneumatic tire according to claim 3, wherein the tire is formed so that the outer contour between the maximum projecting point and the maximum recessing point is a straight line having an inclination parallel to that of the folded portion, in the state that the tire is installed on a normal rim and the inner pressure of the tire is 50 kPa.

11. The pneumatic tire according to claim 4, wherein the tire is formed so that the outer contour between the maximum projecting point and the maximum recessing point is a straight line having an inclination parallel to that of the folded portion, in the state that the tire is installed on a normal rim and the inner pressure of the tire is 50 kPa.

12. The pneumatic tire according to claim 2, wherein the contour of the tire comprises an outer convex swelling portion, where the contour swells to the outside of the norm arc in the tire axis direction, the swelling portion is disposed at a region radially inner side of the recessing portion and is connected with the separating point to leave from the rim.

13. The pneumatic tire according to claim 3, wherein the contour of the tire comprises an outer convex swelling portion, where the contour swells to the outside of the norm arc in the tire axis direction, the swelling portion is disposed at a region radially inner side of the recessing portion and is connected with the separating point to leave from the rim.

14. The pneumatic tire according to claim 4, wherein the contour of the tire comprises an outer convex swelling portion, where the contour swells to the outside of the norm arc in the tire axis direction, the swelling portion is disposed at a region radially inner side of the recessing portion and is connected with the separating point to leave from the rim.

15. The pneumatic tire according to claim 1, wherein the contour of the tire comprises an outer convex swelling portion, where the contour swells to the outside of the norm arc in the tire axis direction, the swelling portion is disposed at a region radially inner side of the recessing portion and is connected with the separating point to leave from the rim.

16. An air filled tire comprising a carcass having a carcass body portion extending from a tread portion to a bead core through a side wall portion, and a folded portion folded at the bead core, which is continuously formed with the carcass body portion, wherein:

in a standard state that the tire is installed on a normal rim and the inner pressure of the tire is in the normal, the contour of the tire outer surface in the meridian cross section between a tire cross section maximum width point P1, which is the most outer point of the tire surface in the tire axis direction, and a flange separating point P3 to leave from a flange of the ring, is defined as follows:

the contour comprises:
a substantially triangular formed projecting portion projecting outside in the direction of the tire axis direction with respect to a norm arc, which is an arc having its center on a line passing the tire cross section maximum width point P1, the norm arc passes through the point P1 and tangentially contacts with the flange,
a recessing portion recessing in the tire axis direction toward inside with respect to the norm arc, the recessing portion extends toward the inner side in the radial direction continuously with the projecting portion, and
an outer convex swelling portion disposed from the recessing portion to the flange separating point P3, and swelling in the tire axis direction toward outside with respect to the norm arc;

the height (h1) of a maximum projecting point with respect to a bead base line is 0.85~1.15 times of the height (h0) of the outer end of the folded portion, where the maximum projecting point is a point on the projecting portion and is separating at most from the norm arc in the tire direction;

the height (h2) of the maximum recessing point with respect to a bead base line is smaller than the height (h1), and is 0.30~0.90 times of the height (h0), wherein the maximum recessing point is a point on the recessing portion and is separating at most from the norm arc in the tire direction; and the maximum boss distance (q1) from the norm arc to the maximum projecting point and the maximum recessing distance (q2) from the norm arc to the maximum recessing point are respectively 0.001~0.040 times of the tire cross section width (W).

* * * * *